United States Patent
Schroth

(10) Patent No.: US 8,106,823 B2
(45) Date of Patent: Jan. 31, 2012

(54) METHOD OF OPERATING A SATELLITE NAVIGATION RECEIVER

(75) Inventor: Georg Schroth, Munich (DE)

(73) Assignee: Deutsches Zentrum Fuer Luft-und (DE)

( * ) Notice: Subject to any disclaimer, the term of this patent is extended or adjusted under 35 U.S.C. 154(b) by 118 days.

(21) Appl. No.: 12/386,538

(22) Filed: Apr. 20, 2009

(65) Prior Publication Data

US 2009/0273511 A1    Nov. 5, 2009

(30) Foreign Application Priority Data

Apr. 21, 2008   (EP) .................................... 08007700

(51) Int. Cl.
    *G01S 19/28*   (2010.01)
(52) U.S. Cl. ................................. 342/357.67
(58) Field of Classification Search ............. 342/357.02, 342/357.67
    See application file for complete search history.

(56) References Cited

U.S. PATENT DOCUMENTS

| | | | |
|---|---|---|---|
| 5,631,838 A | 5/1997 | Ishikawa et al. | 364/449.9 |
| 5,760,737 A * | 6/1998 | Brenner | 342/357.58 |
| 5,808,581 A * | 9/1998 | Braisted et al. | 342/357.58 |
| 5,841,399 A * | 11/1998 | Yu | 342/357.29 |
| 6,012,013 A * | 1/2000 | McBurney | 701/207 |
| 6,211,822 B1 * | 4/2001 | Dougherty et al. | 342/357.36 |
| 6,639,549 B2 | 10/2003 | Vanderwerf et al. | 342/357.02 |
| 6,720,915 B2 * | 4/2004 | Sheynblat | 342/357.67 |
| 2003/0231132 A1 * | 12/2003 | Park et al. | 342/357.15 |

FOREIGN PATENT DOCUMENTS

WO   WO 2007/064250   6/2007

OTHER PUBLICATIONS

R. Grover Brown, "Receiver Autonomous Integrity Monitoring," Iowa State University, Ames, Iowa 50011, 1993, pp. 143-165.

* cited by examiner

*Primary Examiner* — Thomas Tarcza
*Assistant Examiner* — Frank McGue
(74) *Attorney, Agent, or Firm* — Ohlandt, Greeley, Ruggiero & Perle, LLP

(57) ABSTRACT

A receiver operating with satellite navigation signals estimates its position by means of a multiplicity of signals each transmitted by another satellite. A subset of satellites is used to calculate the position estimation and checking the pseudoranges of all received satellite signals that did not contribute to this particular estimate with respect to their consensus with this estimate. The subset with the best consensus is determined by combining the subsets with respect to the consensus with all ranging sources in view. Consensus in this context refers to pseudoranges that coincide in a position solution in a consistent way. The satellites with a bias in pseudorange higher than a threshold are identified as faulty satellites, after knowing all consistent satellites. This identifying information is then used to exclude the faulty satellites for the determination of position, velocity, and time in the receiver.

20 Claims, 10 Drawing Sheets

METHOD OF OPERATING A SATELLITE NAVIGATION RECEIVER

BACKGROUND

1. Field of the Disclosure

The present disclosure relates to a method of operating a satellite navigation receiver estimating its position by means of a multiplicity of signals each transmitted by another satellite as ranging source.

2. Discussion of the Background Art

In anticipation of the future Global Navigation Satellite Systems (GNSS) constellations like GPS IIF/III (USA), Galileo (Europe), GLONASS (Russia), and Compass (China) becoming operational, a multitude of questions on the use of these numerous ranging sources will arise. Simulations show that with full Galileo and GPS constellations an average of 18 satellites and a minimum of 13 will be in view for most users. Hence, with the given threat models, the applicability of Receiver Autonomous Integrity Monitoring (RAIM) techniques for the purpose of monitoring position integrity will be increased. Additionally, the use of dual frequency receivers will eliminate almost completely the largest magnitude errors for unaided GPS, those caused by the ionospheric delay.

Unfortunately, one cannot assume that GNSS services different from GPS will have the same satellite failure probabilities which makes it to today's most important integrity threat. A failure probability of $10^{-3}$ might be proven and realized by the control segment much more easily than the currently accepted probability of $10^{-5}$. Altogether, it will no longer be possible to assume that the probability of failure for more than one satellite within a certain timeframe is negligible.

Further, it is questionable if it is always reasonable to compute a position estimate based on all satellites in view rather than selecting only a subset of the "best". In Augmented GPS scenarios like the Local Area Augmentation System (LAAS), it could be necessary to consider and correct only a subset of the current constellation, for reasons related to the available signal bandwidth or due to large propagation errors affecting a number of satellite signals.

WO 2007/064250 A1 describes a method of operating a receiver for satellite navigation. Said method comprises selecting a set of preferred signal sources from a group of potential satellite signal sources, receiving signals from the selected set of signal sources, and producing position/time related data based on the received signals. Said method further comprises estimating a respective processing demand required to produce the position/time related data based on each subset of a number of candidate subsets of signal sources among the group of potential signal sources, each candidate subset containing at least a minimum number of signal sources necessary to produce the position/time related data of a desired quality, and selecting the set of preferred signal sources based on a candidate subset being associated with a lowest estimated processing demand during a subsequent operating period for the receiver. The processing demand may be estimated by estimating a respective signal quality of each signal in the group of potential signal sources. The signal quality may be reflected by signal power parameter estimation and/or noise density parameter estimation and/or pseudorange error parameter estimation and/or parameter indicating interference detection, and/or signal source health/status data.

The Multiple Hypothesis Solution Separation (MHSS) technique, described in Pervan Boris S., Pullen Samuel P. and Christie Jock R.: "A Multiple Hypothesis Approach to Satellite Navigation Integrity", Journal of The Intitute of Navigation, 1998, Vol. 45, pp. 61-71, is one of the most advanced existing approaches to identify faulty satellites by observing their influences on the Vertical Protection Level (VPL). This RAIM technique separates the computation of the VPL in multiple hypotheses, which include the cases where single and multiple satellites or even whole constellations have failed. By determining the individual VPL values under each of the hypotheses, weighted by the probability of their occurrence, one can determine the overall VPL. In order to identify faulty satellites, the algorithm builds subsets of the current geometry by excluding one or multiple satellites at a time. An overall VPL is computed for each subset and, as the VPL should increase with a decreasing number of correct satellites, one can expect that the VPL values for the subsets are all higher than for the full geometry. Nevertheless, if a satellite bias influenced the position estimation by a considerable extent, the computed VPL will decrease when excluding this faulty satellite. Therefore, the satellite that was excluded in the corresponding subset, which results in the lowest VPL, is assumed to be the faulty one. By minimizing the VPL, satellites with a high ranging bias which do not translate in a large position domain error may not be excluded, as their contribution still reduces the VPL, even though to a small extent.

Lee Young C.: "Analysis of Range and Position Comparison Methods as a Means to Provide GPS Integrity in the User Reciever", Annual Meeting of the Insitute of Navigation, Seattle, 1986, pp. 1-4 describes a Range Comparison Method, in which the user receiver first estimates user position and clock bias based on four satellites at a time where an overall of five satellites were assumed. Each of the five 4-satellite navigation solutions is then used to predict the pseudorange to the fifth satellite not included in that particular solution. The differences between predicted pseudoranges and the corresponding measured pseudoranges are used as the basis for detecting an abnormal state. Since only a single linear equation is provided for a hypothesis test, this method can only detect an abnormal state where the error in user position estimate exceeds a threshold; it is not possible to identify any bad satellite(s), using only five satellites.

In contrary to the new procedure, existing techniques use the general approach to identify failures by measuring the level of integrity. One assumes that a satellite signal that does not degrade the integrity should not be excluded from the position estimation. This is for instance the case in the mentioned MHSS technique, which uses the VPL as a measure of integrity. Due to the weighted position solution, even a satellite signal with high ranging bias does not necessarily translate into a large position domain error and can still reduce the overall VPL, even though to a small extent. Hence, in these scenarios the faulty or biased signal is not detected at all. However, the influence of satellite signals to the position estimation can change abruptly (especially in urban canyons) and no prior knowledge about faulty signals is available. Further, with multiple constellations present, one might want to exclude the failed satellite, for instance to improve the accuracy, even if this does not always result in the minimum VPL value, as long as the protection level stays below the Vertical Alert Limit VAL (=upper bound of the VPL).

But also in the scenarios where the most important signal with respect to the position estimation (the one with the highest influence) has a failure, known approaches still need relatively high biases to identify this signal. However, it is of high importance to detect faulty signals already at low biases to allow timely warnings to the user of the receiver.

As already indicated, multiple satellite failures at a time can no longer be neglected with the rise of new GNSS services and the resulting increase of available ranging sources.

It is an object of the present disclosure to originate techniques, which are capable of handling these new requirements, and reliably detect and exclude multiple biased satellite signals at a time.

Another object of the present disclosure is to present a new procedure which is capable of detecting and identifying all satellite signals with a bias higher than a given threshold to pave the way for safety critical and mass-market applications by allowing reliable and accurate estimations of position, velocity, and time at the receiver even during erroneous satellite constellations. Further on, not only the integrity but also the precision of the estimations are to be improved significantly by excluding faulty satellite signals at low biases. With a good estimate of the current ranging bias of each individual satellite, it is possible to reduce also multipath effects by eliminating the common bias.

SUMMARY OF THE DISCLOSURE

According to the present disclosure, the object is achieved by using a subset of said ranging sources to calculate the position estimation and checking the pseudoranges of all received satellite signals that did not contribute to this particular estimate with respect to their consensus with this estimate and thus, the ranging sources of the used subset, by determining the subset with the best consensus by combining the subsets with respect to the consensus with all ranging sources in view, consensus in this context referring to pseudoranges that coincide in a position solution in a consistent way, by identifying the ranging sources with a bias in pseudorange higher than a threshold as faulty ranging sources, after knowing all consistent ranging sources, and by using this identifying information to exclude the faulty ranging sources for the determination of position, velocity, and time in the receiver.

The method proposed here (called RANCO) is based on a paradigm called Random Sample Consensus (RANSAC) that was published by Fischler Martin A. and Bolles Robert C.: "Random Sample Consensus: A Paradigm for Model Fitting with Applications to Image Analysis and Automated Cartography", Communications of the ACM, June 1981, Vol. 24, pp. 381-395. RANSAC is known in the research field of computer vision for smoothing data that contain a significant percentage of gross errors. The RANSAC procedure is opposite to that of conventional smoothing techniques. Rather than using as much of the data as possible to obtain an initial solution and then attempting to eliminate the invalid data points, RANSAC uses an initial data set as small as feasible and enlarges this set with consistent data when possible. It is therefore capable of fitting a model to experimental data by randomly selecting subsets and evaluating their consensus with the overall available data.

In contrast to the known approaches, the method (RANCO) proposed by the present disclosure does not compute an estimation based on all satellites (=ranging sources) and then tries to remove single satellites to investigate their influence on the position solution. It rather uses the minimum necessary subset of ranging sources (signals) to calculate a position estimate. The pseudoranges of all satellite signals that did not contribute to this particular estimate are then checked with respect to their consensus with this estimate and thus, the ranging sources of the used subset.

It is not absolutely necessary to use the minimum necessary subset but it is reasonable, as one can see in the following. By comparing the two groups of ranging sources, those in the subset and those that did not contribute to the position estimation, two different scenarios can occur. On the one hand, the subset can be free of faulty ranging sources and only the other group contains biased signals. One looks at each individual ranging source and compares the measured pseudorange with the range that would correspond with the current position estimation. If the difference exceeds a certain threshold, the according satellite signal is said to disagree with the current estimation. On the other hand, one might have a biased signal within the selected subset. In this scenario, one cannot make any statements about the quality of the other signals. As there is used only the minimum necessary number of ranging sources to compute an estimate, a signal bias translates directly into a position error and one can assume that nearly none of the correct ranging sources will correspond to such position estimate. By using only the minimum necessary number of ranging sources, the probability that a faulty satellite signal is part of the subset is minimized.

As one cannot know a priori which subsets include faulty signals, it is necessary to find out the subset that has the highest probability of being free of such biased ranging sources. By iterating through all preselected subsets, they are ranked by the number of corresponding ranging sources. That means that the subset resulting in a position estimation, which corresponds to the most ranging sources, is the subset with the highest probability of being free of biased signals. This can be additionally verified by a simple RAIM algorithm to check the integrity of the consensus set. At this point, a weighted least square solution, of all ranging sources that were part of the subset or agreed with it, is computed. Again, this set of ranging sources is assumed fault free as they all agree with each other. Starting with this new smoothed position estimation based on many ranging sources, once more the measured pseudoranges of all satellites are compared with this estimation. Those satellites whose pseudorange differs more than allowed by the threshold are identified to be faulty. This last comparison can also be used as a measure of the magnitude of consensus. Correlations in the magnitude among different pseudoranges can be used to reduce multipath effects or for the identification of ionospheric fronts.

To simulate and evaluate this approach it is not necessary to use the real pseudoranges or to calculate the real position solution. As the degree of consensus between the ranges is interesting, rather the distributions and errors are considered to avoid many unnecessary computations. The well-known position measurement in equation (1) shows the true position vector x, the geometry matrix G, the pseudorange vector y, and the noise vector n:

$$y = Gx + n. \qquad (1)$$

Equation (1) also holds for a single satellite, where $\tilde{y}$ and $\tilde{n}$ are the pseudorange and noise scalars and $g^T$ is the corresponding line in the geometry matrix, where the first three columns are the components of the normal vectors between the true position and the individual satellites:

$$\tilde{y} = g^T x + \tilde{n}. \qquad (2)$$

The least square estimation for the position is obtained by inverting the G matrix. As only subsets of four are considered, the linear system is not over determined, and therefore it is not necessary to build the Moore-Penrose pseudoinverse:

$$\hat{x} = Hy = HGx + Hn \qquad (3)$$

$$H = G^{-1}. \qquad (4)$$

Now, the consensus between the position estimate that was derived by a subset of four satellites and the remaining satellites has to be evaluated. Therefore, equation (2) is remodeled and stated for the noise free case:

$$g^T\hat{x}-\hat{y}=0. \quad (5)$$

Equation (5) is the main relation, which has to be evaluated for all satellites and with every reasonable subset of four. As already mentioned, it is not necessary to calculate the true position estimates but only to investigate the errors.

Thus, equations (2) and (3) are inserted into equation (5) and HG=1 is eliminated.

$$g^T Hn - \tilde{n} = 0. \quad (6)$$

The final equation (6) can now be used for the simulations of the approach proposed by the present disclosure called RANCO. The thresholds for the comparisons can be set relative to the variation (sigma) of the predicted error distributions for each ranging source individually. This allows the use of all available information and accounts for the influence of effects depending on elevation angles. Setting the threshold also relative to the variances of the currently used subset will improve the performance significantly. With the Inverse of the Covariance Matrix of the ranging sources W and the vector of variances σ, the overall variance of the residuals of the comparison is therefore:

$$\sqrt{g^T(G^T W G)^{-1} g + \sigma^2}. \quad (7)$$

The preselection of subsets is of high importance for the performance of the described technique. This is due to the fact that there exists a huge amount of subsets (n choose k) that would take a long time to process. Further, many of the subsets do have a weak geometry, because the normal vectors between the receiver and the individual satellites are in about the same direction, and are therefore very sensitive to errors. Hence, a selection technique that evaluates the subsets with respect to their geometry is useful. A first approach computes the condition of the geometry matrices and thus evaluates the orthogonality of the normal vectors in the four-dimensional vector space. This technique is similar to the evaluation by computing the Dilution of Precision (DOP). To incorporate the estimated variances of the pseudoranges of each satellite that is part of the subset one can use the Weighted Dilution of Precision (WDOP) as a rating for the subsets. This results in the best performance of the overall procedure. However, another approach is significantly faster. Here, we determine the orthogonality only in a two-dimensional space by calculating the correlation of each possible pair of normal vectors. Pairings that have a high correlation value, and thus show in about the same direction, are not desired in the subsets. Therefore, all subsets with unacceptable pairings are excluded. A combination of both, this fast approach and a subsequent precise ranking with the WDOP is optimal.

The above described method allows one to identify as many outliers as the number of satellites in view minus the minimum necessary number of satellites for the estimation (for instance four), and minus at least one additional satellite that confirms this estimation. As long as more than four plus at least one satellites in view are consistent with respect to the pseudoranges, one can reliably exclude the ones that have a bias higher than the threshold.

However, one might be sure, that not more than a certain number of satellite signals have a bias at a time. Thus, a post selection technique allows finding the minimum necessary array of subsets that is capable of identifying a certain maximum number of satellites as faulty. This approach determines all possible combinations of failed satellites. It sequentially selects the subsets by identifying the satellites that have the lowest occurrence in the remaining possible failure combinations. A subset can check all combinations composed of the satellites the subset does not contain. Thus, we have to find the satellites that occur most rarely in the remaining failure combination and find a subset that contains them. This subset is then able to check the most remaining failure combinations. This approach adapts the necessary computations in the failure detection and exclusion technique to the assumptions made.

A second failure detection method, which here is called S-RANCO and is very closely related to the first one, is also capable of detecting satellite failures but its strength can be found in the suggestion of possibly failed satellites at very low biases. Therefore, the results with this approach can serve as an input for additional algorithms. The major differentiator of this algorithm is that it does not search for the subset with the least outliers but counts the number of times for each satellite being an outlier. Every time a satellite is determined to be an outlier, the counter for that satellite is increased. As it is not guaranteed that every satellite is included in exactly the same amount of subsets, the times the satellite is part of the current subset are also counted. This is necessary, as a satellite that is part of the position solution cannot be an outlier. The addition of the counters normalizes these different initial conditions. The satellite with the highest counter value is most likely to be faulty and should be investigated by a subsequently executed procedure. If 1000 subsets are considered for instance and the value for a specific satellite reaches also 1000 or values close to it, than it is clear that this satellite has been an outlier for all or almost all subsets it was not part of. In this case, the procedure would not only suggest to investigate the corresponding satellite but also identifies the satellite to be failed. A combination of both, this fast approach and a subsequent precise ranking with the WDOP is optimal.

By excluding faulty satellite signals at low biases, not only the integrity but also the precision of the estimations can significantly be improved. With a good estimate of the current ranging bias of each individual satellite, it is possible to reduce also multipath effects by eliminating the common bias.

Further advantages, beneficial features and applications of the present disclosure will be apparent from the following description and the dependent claims.

BRIEF DESCRIPTION OF THE DRAWINGS

The present disclosure is now to be explained more closely by means of preferred embodiments, which are disclosed as examples, and with reference to the attached drawings.

DETAILED DESCRIPTION OF THE PREFERRED EMBODIMENT

The new procedure according to the present disclosure, called RANCO, is capable of detecting and identifying all (number of satellites in view minus necessary number of satellites for the position estimation (i.e. four) minus at least one additional satellite) navigation satellite signals with a range bias higher than a given threshold. This paves the way for safety critical and mass-market applications by allowing reliable and accurate estimations of position, velocity, and time at the receiver even during erroneous satellite constellations.

Further on, by excluding faulty satellite signals at low biases not only the integrity but also the precision of the estimations can significantly be improved. With a good estimate of the current ranging bias of each individual satellite, it is possible to reduce also multipath effects by eliminating the common bias.

In contrast to known approaches, the new procedure does not compute an estimation of position based on all satellites and then tries to remove single satellites to investigate their influence on the position solution. It rather uses a subset of ranging sources (signals) to calculate a position estimate. The pseudoranges of all satellite signals that did not contribute to this particular estimate are then checked with respect to their consensus with this estimate and thus, the ranging sources of the used subset, see FIG. 1. By combining the subsets with respect to the consensus with all satellites in view, the subset with the best consensus can be determined. In this context consensus refers to pseudoranges that coincide in a position solution in a consistent way.

Figure 1:
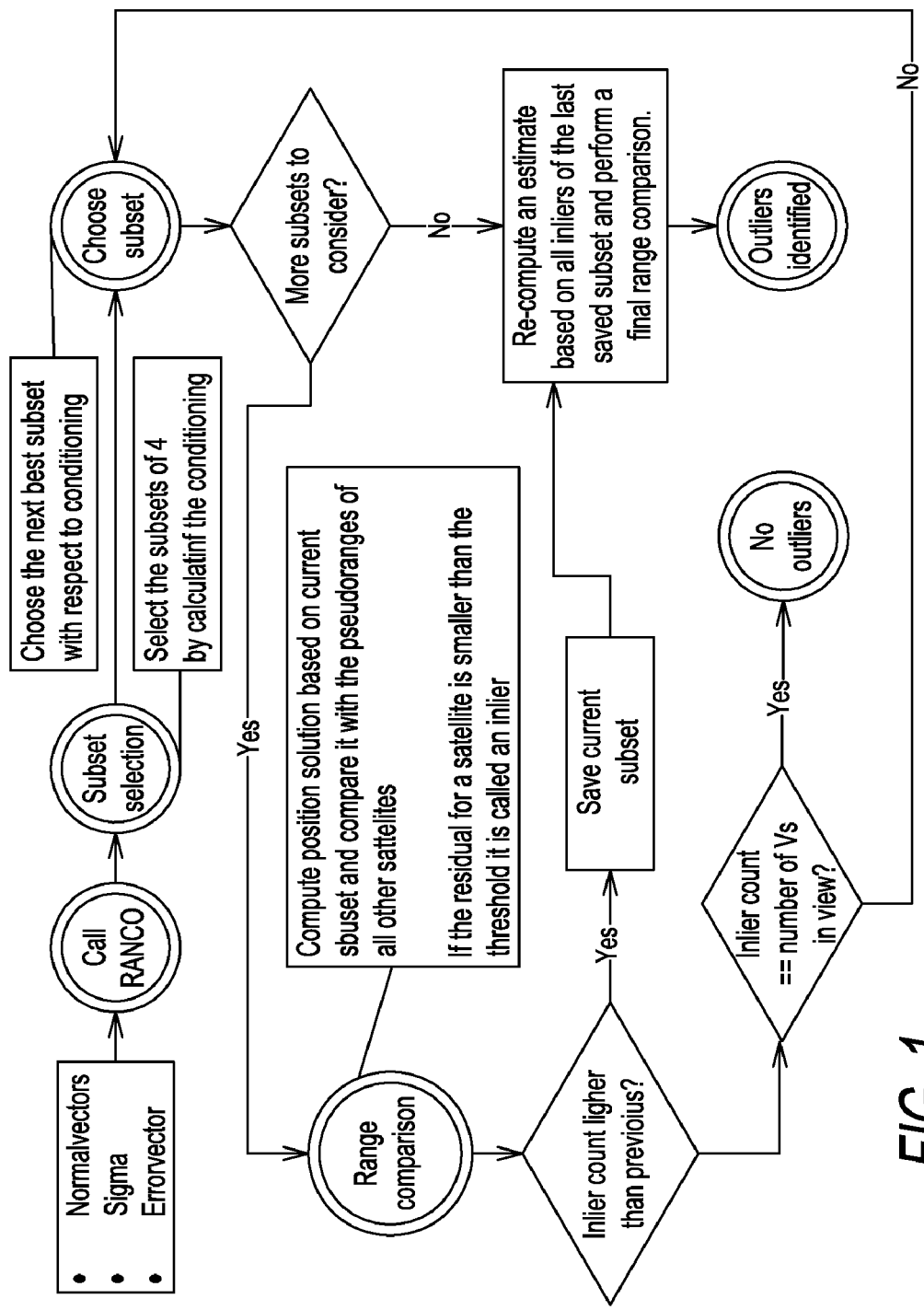
FIG. 1 shows a data flow diagram for the method according to the present disclosure called RANCO technique.
Figure 5:
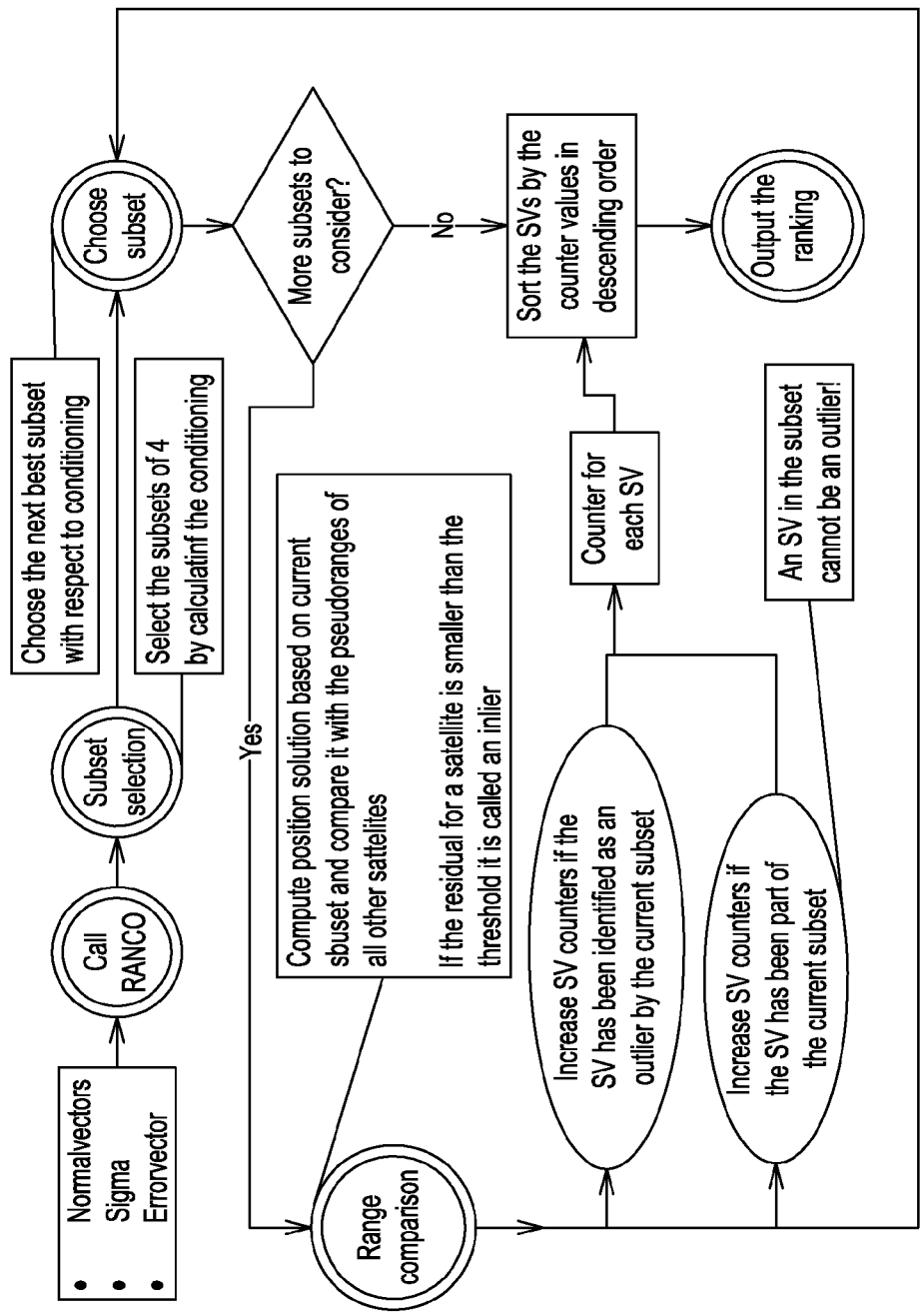
FIG. 5 illustrates a data flow diagram for the S-RANCO technique whose conditioning is explained in FIG. 2.

In FIG. 1 and also in FIG. 5 "Normalvectors" are normalized vectors showing from the receiver to the individual satellites, "Sigma" represents the variances of the predicted error distributions for each ranging source (=satellite) depending on the elevation angle, and "Errorvector" is the vector containing the true signal biases, which is only necessary for simulation. SV means Space Vehicle.

Verifying the subsets together with their consistent ranging sources by any RAIM algorithm, to check the integrity of this set, can avoid selecting a faulty subset.

Knowing all "consistent satellites", the satellites with a bias in pseudorange higher than a threshold can be identified as faulty satellites. This information is used in the receiver (see FIG. 6) to exclude the faulty satellites for the determination of position, velocity, and time. As a result, solutions can be determined having the optimum integrity and accuracy with respect to the system parameters.

The thresholds for the comparisons can be set relative to the variation of the predicted error distributions for each ranging source individually. This allows the use of all available information and accounts for the influence of effects depending on elevation angles. Setting the threshold also relative to the variances of the currently used subset will improve the performance significantly.

Figure 2:
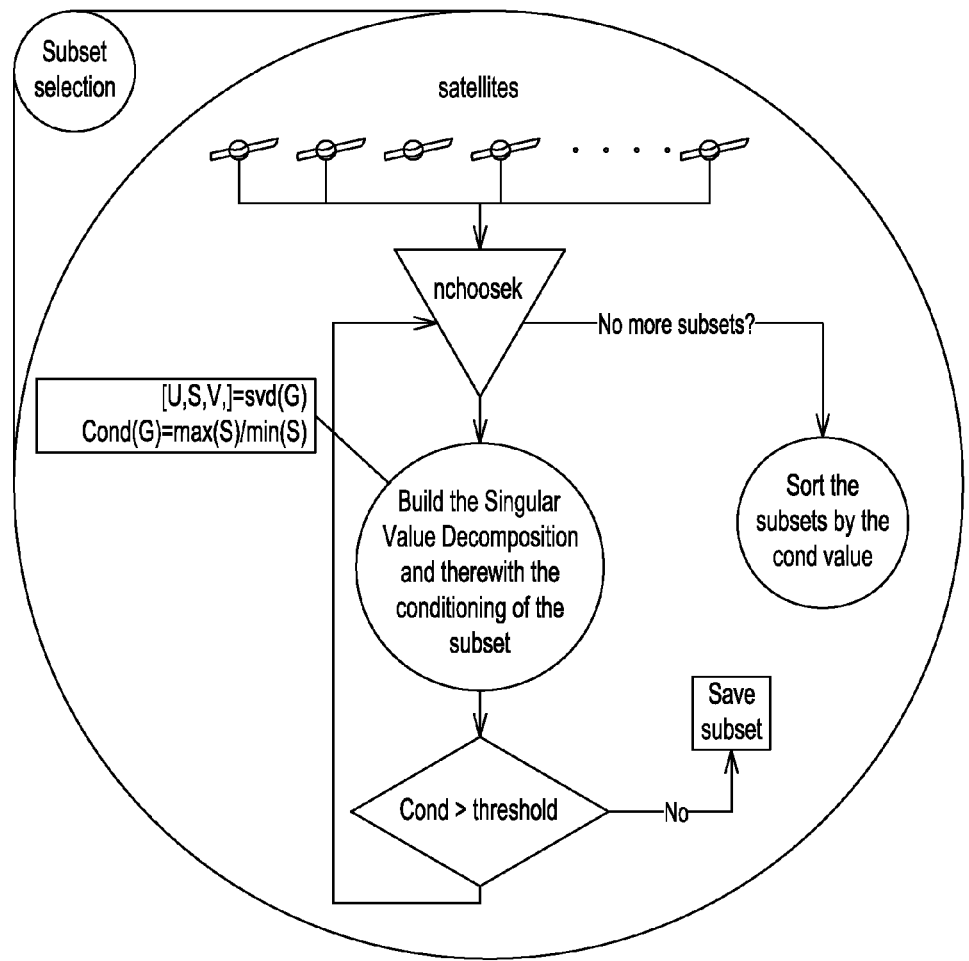
FIG. 2 illustrates a flow diagram of the first approach of the subset selection method, wherein nchoosek describes the function calculating all possible subsets.
Figure 3:
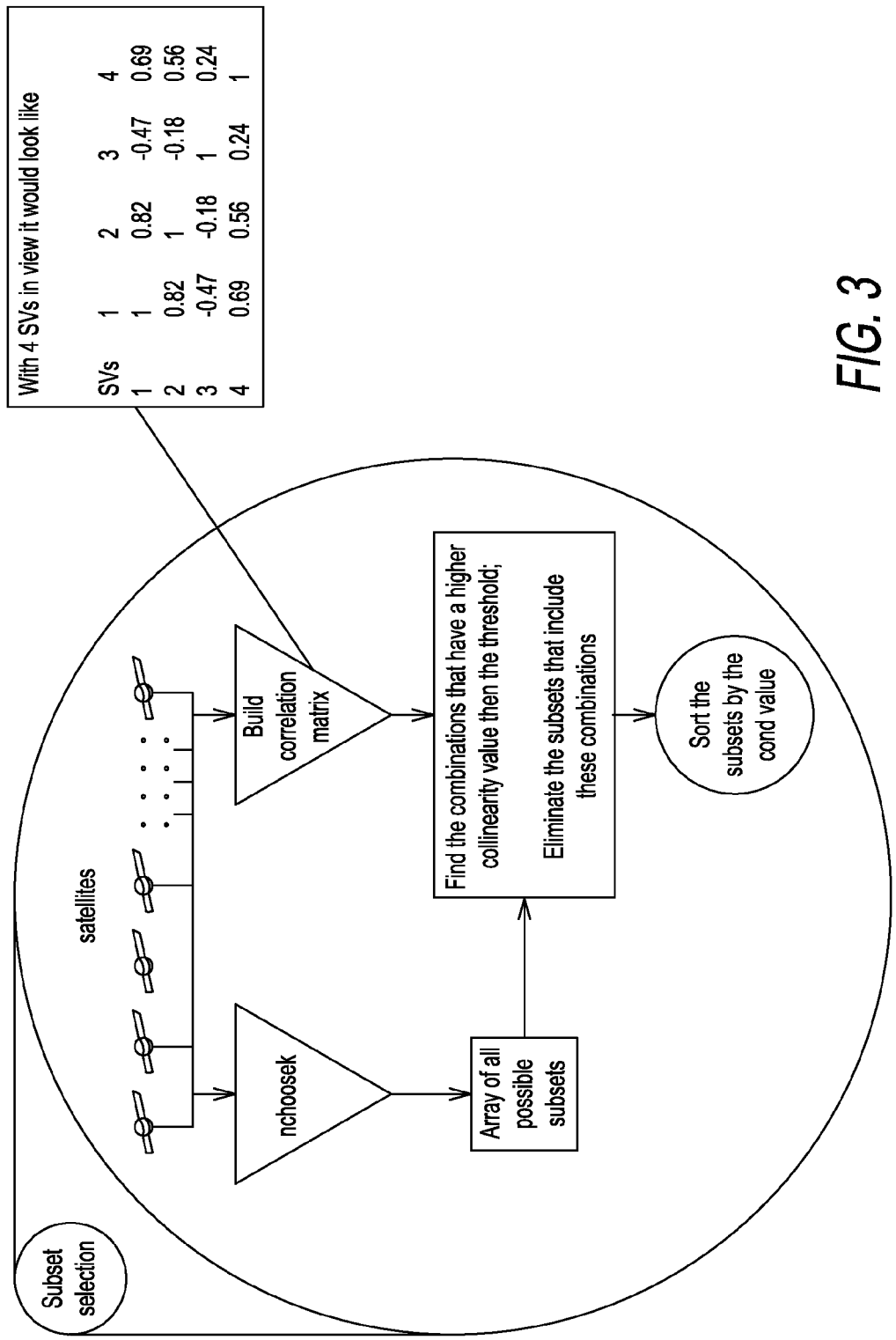
FIG. 3 illustrates a flow diagram of the second approach of the subset selection method.

The preselection of subsets is of high importance for the performance of the described technique. Hence, a selection technique that evaluates the subsets with respect to their geometry is utilized. As FIG. 2 shows, the first approach computes the condition of the geometry matrices and thus evaluates the orthogonality of the normal vectors in the four-dimensional vector space. This technique is similar to the evaluation by computing the Dilution of Precision (DOP). To incorporate the estimated variances of the pseudoranges of each satellite that is part of the subset one can use the Weighted Dilution of Precision (WDOP) as a rating for the subsets. This results in the best performance of the overall procedure. However, another approach is significantly faster. Here, we determine the orthogonality only in a two-dimensional space by calculating the correlation of each possible pair of vectors (from the receiver to the individual satellites), see FIG. 3. Pairings that have a high correlation value, and thus show in about the same direction, are not desired in the subsets. Therefore, all subsets with unacceptable pairings are excluded. A combination of both, this fast approach and a subsequent precise ranking with the WDOP is optimal.

Figure 4:
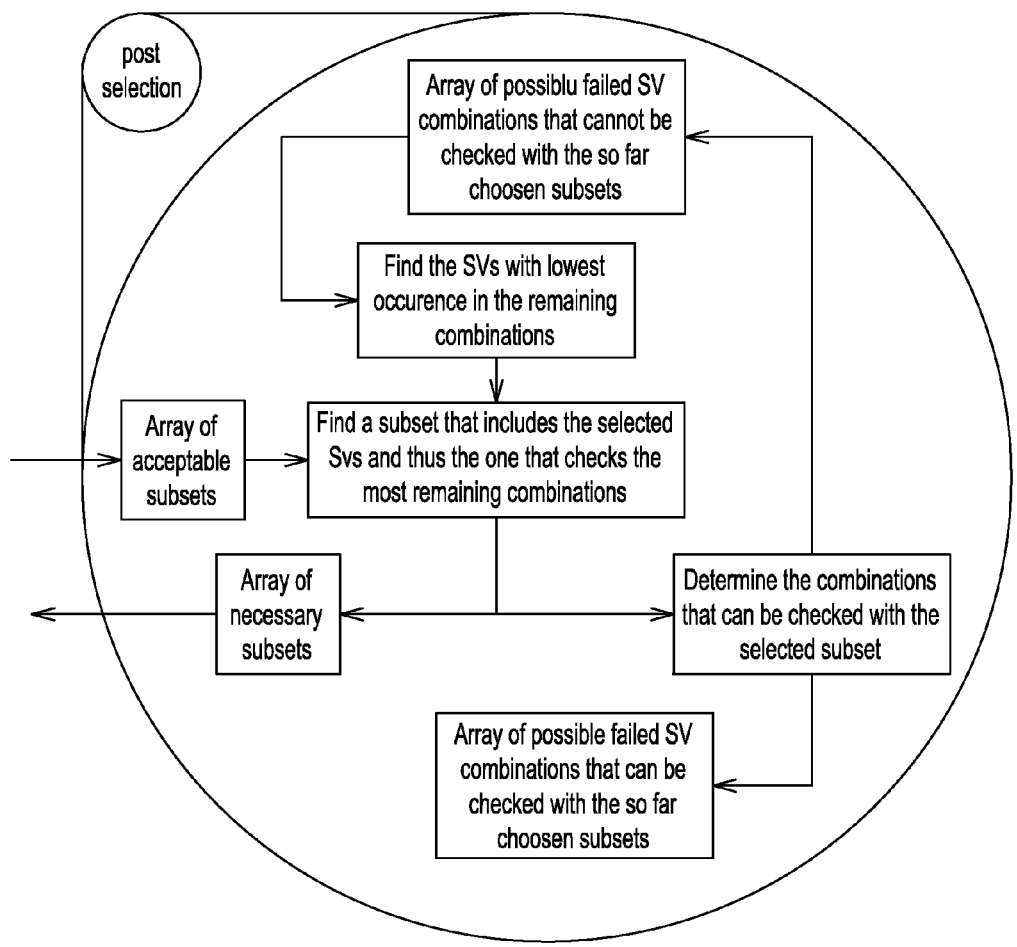
FIG. 4 illustrates a flow diagram of post subset selection method wherein the array of all possible failed satellite (SV) combinations is calculated in advance.

To identify only a certain maximum number of faulty satellites, a post selection technique is applied. It allows finding the minimum necessary array of subsets that is capable of identifying the defined maximum number of satellites as faulty, see FIG. 4. This approach adapts the necessary computations in the failure detection and exclusion technique to the assumptions made. Here the subsets are not only selected with respect to their ability to check failure combinations but also by their WDOP value.

The second so called S-RANCO failure detection method illustrated in FIG. 5, which is very closely related to the first one, is also capable of detecting satellite failures but its strength can be found in the suggestion of possibly failed satellites at very low biases. Therefore, the results with this approach can serve as an input for additional algorithms. The major differentiator of this algorithm is that it does not search for the subset with the least outliers but counts the number of times for each satellite being an outlier. The satellite with the highest counter value is mostly likely to be faulty and should be investigated by a subsequently executed procedure.

Figure 6:
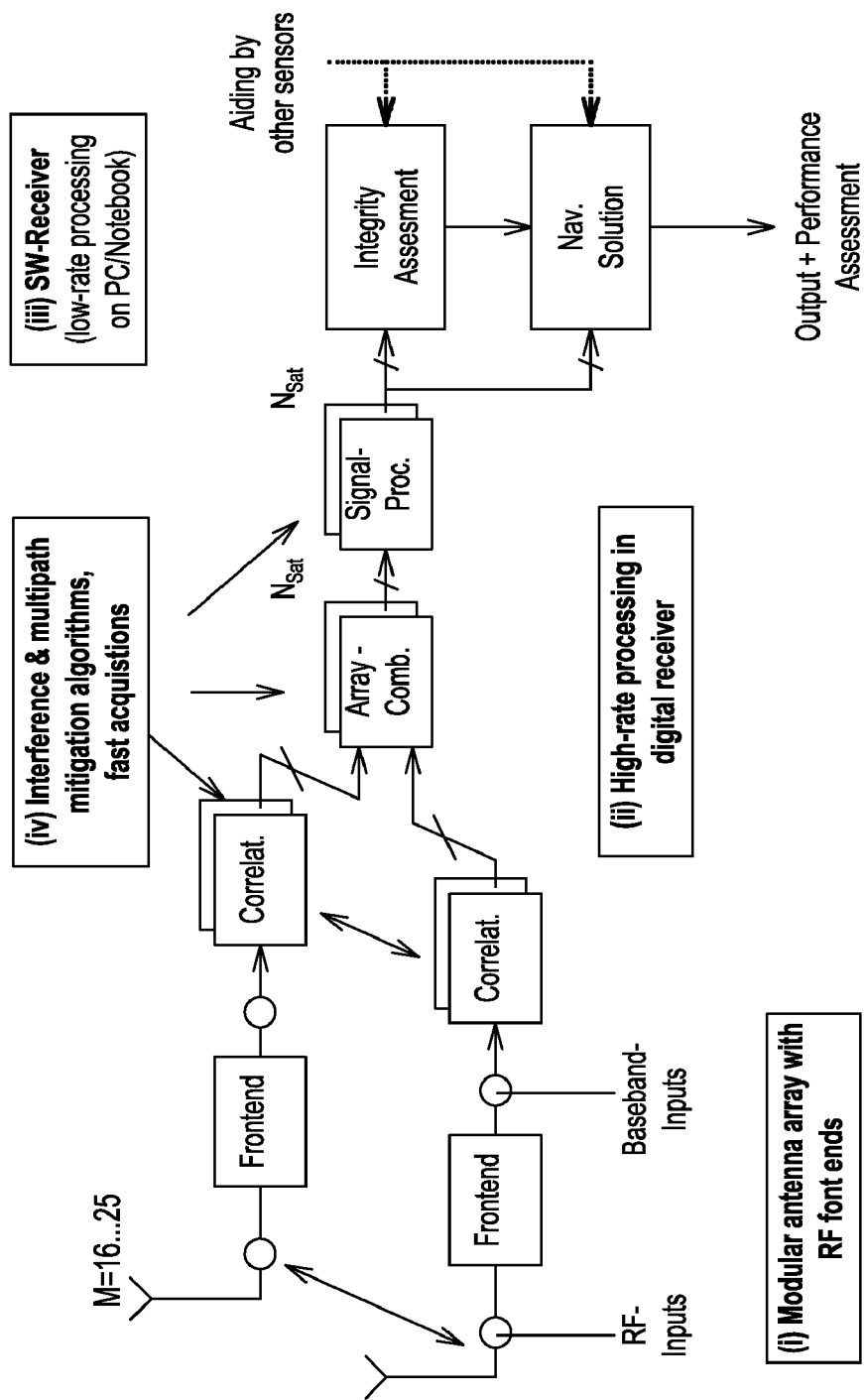
FIG. 6 illustrates a schematic diagram of a generic receiver used to perform the method according to the present disclosure.

FIG. 6 shows a generic block diagram of a satellite navigation receiver. The novel procedure for the identification of the faulty satellite signals can be directly implemented in the block Integrity Assessment.

The failure detection and exclusion technique proposed by the present disclosure is not depending on the number of receiver antennas. The safety of life receivers can take advantage with respect to the mitigation of interfering signals by the utilization of an array of antennas.

Figure 7:
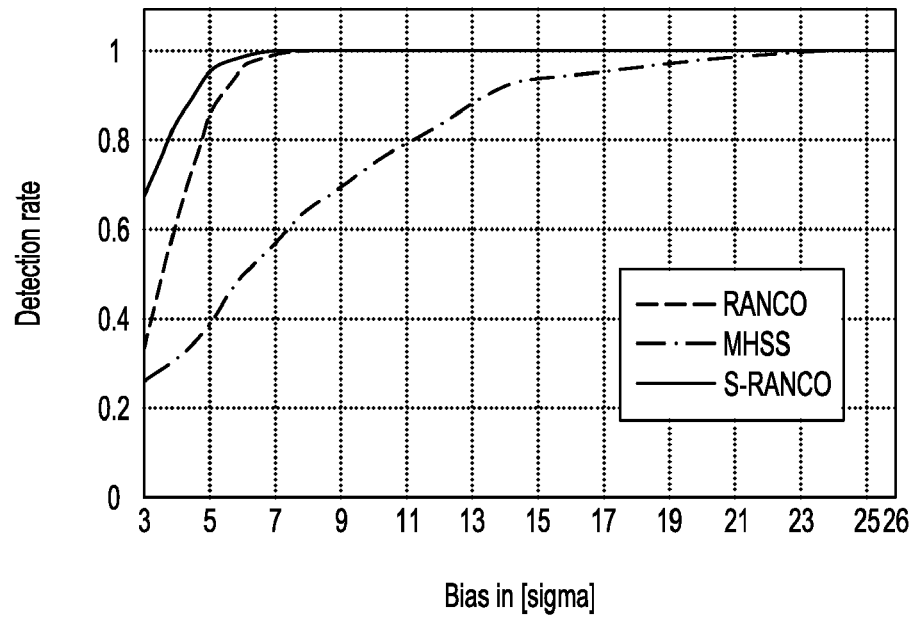
FIG. 7 shows a graph illustrating detection rate by selecting the most critical satellite in view (SV) to be failed, for the existing MHSS approach and the techniques proposed by the present disclosure.
Figure 8:
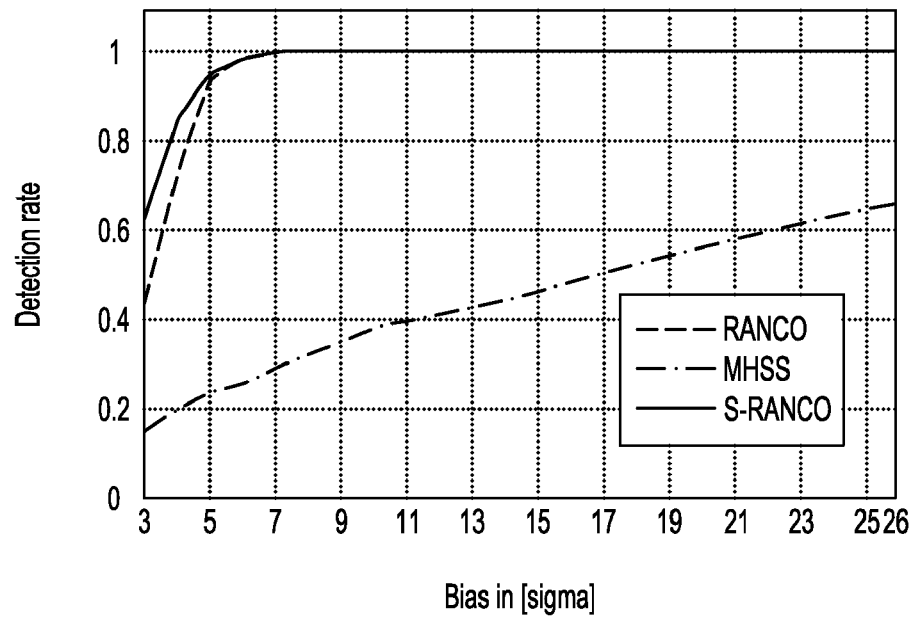
FIG. 8 shows a graph illustrating detection rate by selecting the least critical satellite in view (SV) to be failed, for the existing MHSS approach and the techniques proposed by the present disclosure.

FIG. 7 and FIG. 8 show the difference in the performance, in case that only one SV (satellite in view) fails, for the existing MHSS approach and the new techniques proposed by the present disclosure and called RANCO and S-RANCO, respectively. In both diagrams, the detection rate is plotted versus the signal bias in multiples of the variance sigma. A detection rate of one means, that a signal with a bias, equal to the given value on the horizontal axis, can be detected every time. In the graph of FIG. 7, the most critical satellite was selected to be the failed, and therefore the one with the highest influence to the position solution, whereas in the graph of FIG. 8 it was the most unimportant one. RANCO is hardly influenced by this but the MHSS needs much higher biases to identify which satellite has failed. The simulation was performed assuming a combined GPS plus Galileo constellation. As this technique is designed for the use at any combined constellation, it is performing significantly better in this environment. However, it can also be used with a single constellation present, where it still detects failed satellites at lower biases than MHSS.

Figure 9:
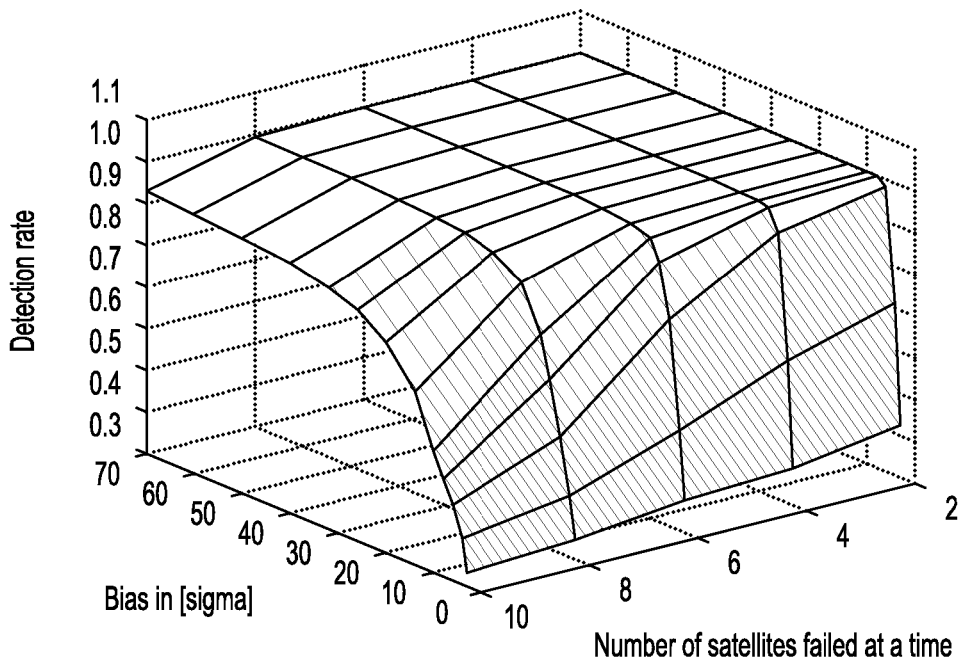
FIG. 9 shows a diagram illustrating the detection results of a simulation with different numbers of satellites failed (RANCO)

FIG. 9 shows the results of a simulation experiment with different numbers of satellites failed. There are cases where the algorithm detects only partially the failed satellites. To quantify detection, a correct and complete detection is weighted as 100% and a partial detection of the failed satellites in the corresponding percentage. The average detection score is visualized in FIG. 9. With an increasing number of satellite failures, the necessary bias for a correct detection is increasing by about one sigma for each additional failed satellite. This behavior changes when we encounter more than seven failures. With the distribution of the number of visible satellites in mind, we see that at least four satellites plus one additional correct satellite are necessary to identify a subset that does not include biased ranging sources and consequently results in an acceptable position estimate. This is necessary in order to be able to correctly detect the remaining satellites as outliers (and thus faulty). Independent of the bias, the constellations where this constraint is not fulfilled cannot be correctly analyzed. For the case where ten satellites have failed, at least 15 satellites in view are necessary to identify all outliers.

Figure 10:
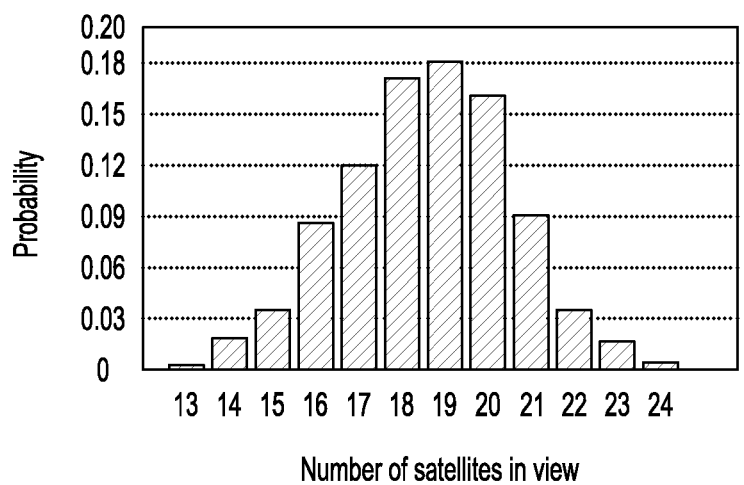
FIG. 10 shows a graph illustrating a probability distribution of the number of satellites in view of a receiver.

The distribution in FIG. 10 shows that 5.6% of the geometries considered in a combined GPS and Galileo constellation have 15 satellites or fewer in view. At a bias of 70 times sigma the detection rate is determined to be 93%, which matches very well the theoretical limit. Further on, it is important that the errors are not correlated. If there are more correlated faulty satellites than correct ones, the algorithm will also not be able to detect them. Altogether, the algorithm is able to identify at most the "number of satellites in view—(4+1)" faulty satellites.

To obtain results of statistical significance, the following simulations were based on a single geometry with only 13 satellites in view and one million samples were recorded. There are two thresholds where the first one is meant to identify the inliers within the run through all subsets and therefore to identify the best subset. The second threshold is applied after calculating a weighted least square solution based on all previously identified inliers.

Figure 11:
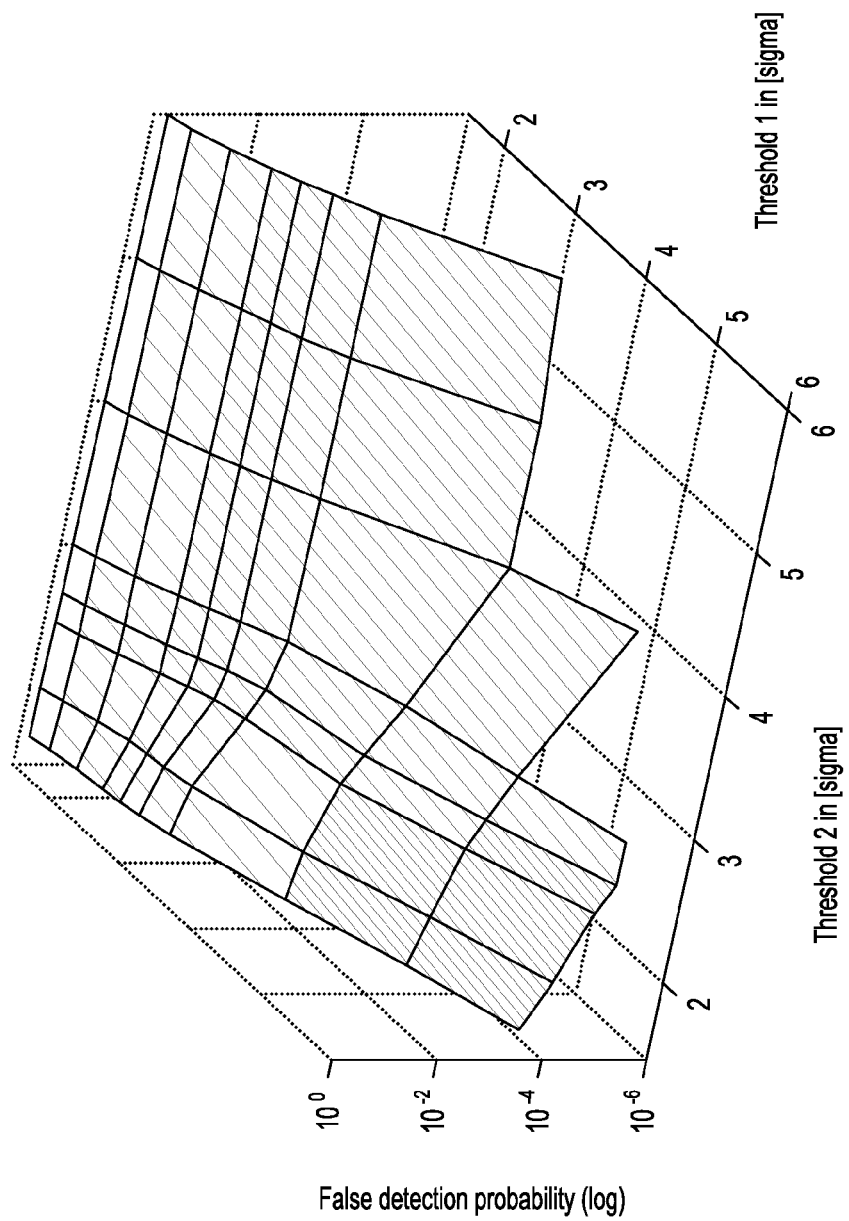
FIG. 11 shows a graph illustrating a false detection probability as a function of the thresholds (RANCO)
Figure 12:
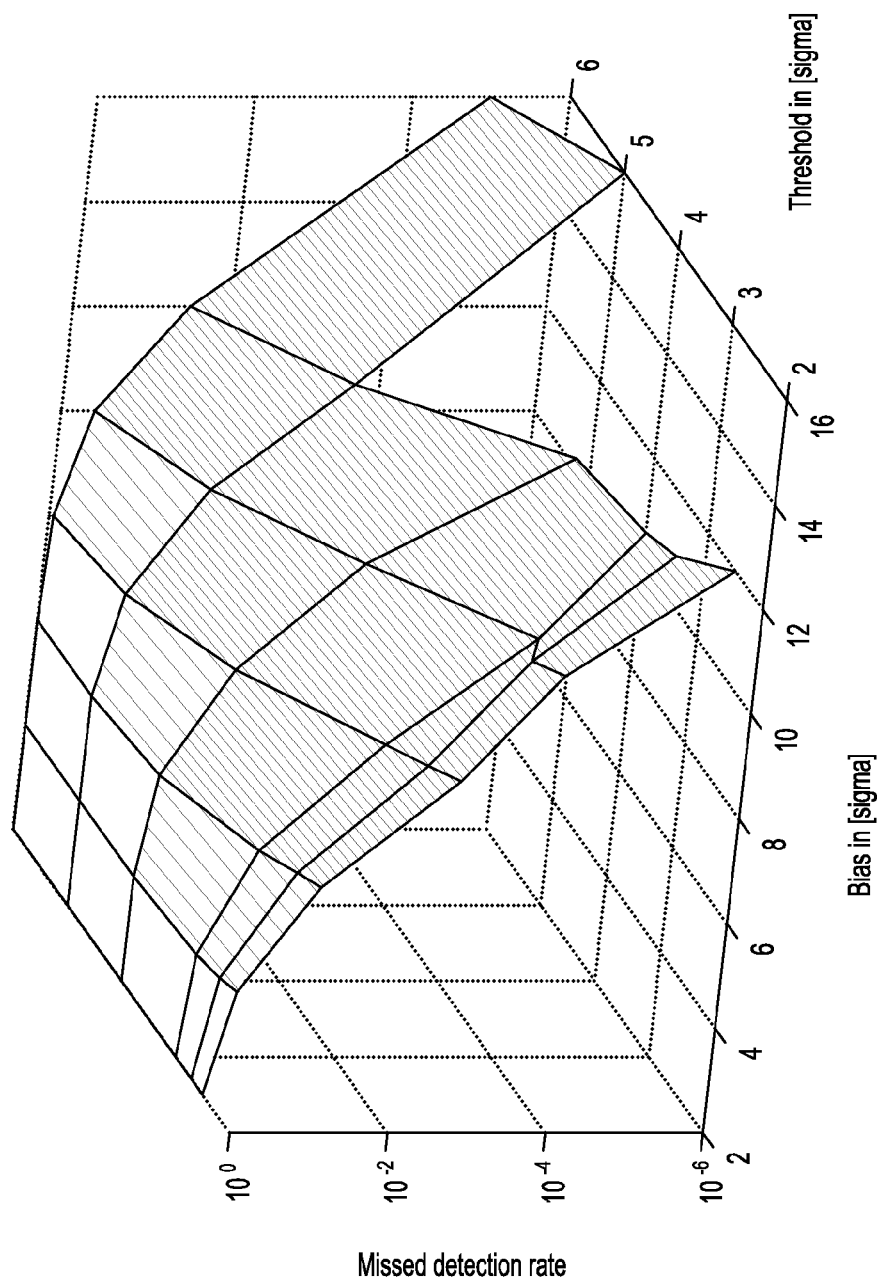
FIG. 12 shows a graph illustrating a missed detection probability as a function of the thresholds (RANCO).

The blank areas in the logarithmic graphs of FIG. 11 and FIG. 12 show that not a single false detection could be recognized within one million samples.

As shown in FIG. 11, in the most cases it is convenient to set both thresholds to the same values. Further on, the Missed Detection Probability for different biases and thresholds was analyzed. The following FIG. 12 shows the relationship between the applied threshold and the necessary bias.

The novel method according to the present disclosure is of significant importance for all types of satellite navigation receivers (terminals). Ultimately, the significant improvement of integrity and accuracy at the receiver without any further augmentation systems is an advantage of high economic value. For safety of live (integrity) as well as for mass-market applications (accuracy) this novel procedure has a high chance to be implemented in receivers with state of the art chipsets. In the fields of geodesy, telematics, location based services, and safety critical applications, etc. improvements concerning integrity and accuracy are requested.

What is claimed is:

1. A method of operating a satellite navigation receiver estimating its position, said method comprising:

receiving a multiplicity of signals each transmitted by another satellite as a ranging source;

using a subset of said ranging sources to calculate the position estimation and checking the pseudoranges of all received satellite signals that did not contribute to this particular estimate with respect to their consensus with this estimate and thus, the ranging sources of the used subset, the used subset being of minimum size by combining the number of available satellites with the best consensus to minimize a probability that a faulty satellite signal is part of said subset, determining the subset with the best consensus by combining the subsets with respect to the consensus with all ranging sources in view, consensus in this context referring to pseudoranges that coincide in a position solution in a consistent way, identifying the ranging sources with a bias in pseudorange higher than a threshold as faulty ranging sources, after knowing all consistent ranging sources, and using this identifying information to exclude the faulty ranging sources for the determination of position, velocity, and time in the receiver.

2. The method according to claim 1, further comprising using only the minimum necessary number of ranging sources.

3. The method according to claim 1, further comprising verifying the subsets together with their consistent ranging sources by a simple RAIM algorithm, to check the integrity of this set, to avoid selecting a faulty subset of ranging sources.

4. The method according to claim 1, further comprising utilizing a preselection technique of subsets that evaluates the subsets with respect to their geometry.

5. The method according to claim 4, further comprising computing the condition of the geometry matrices and thus evaluating the orthogonality of the normal vectors in the four-dimensional vector space.

6. The method according to claim 5, further comprising using the Weighted Dilution of Precision (WDOP) as a rating for the subsets to incorporate the estimated variances of the pseudoranges of each ranging source that is part of the subset.

7. The method according to claim 5, further comprising combining with the preselection technique of determining the orthogonality only in a two-dimensional space by calculating the correlation of each possible pair of vectors from the receiver to the individual ranging sources, and by excluding all subsets with unacceptable pairings having a high correlation value by showing in about the same direction.

8. The method according to claim 4, further comprising determining the orthogonality only in a two-dimensional space by calculating the correlation of each possible pair of vectors from the receiver to the individual ranging sources, and by excluding all subsets with unacceptable pairings having a high correlation value by showing in about the same direction.

9. The method according to claim 1, further comprising applying a post selection technique to identify only a certain maximum number of faulty ranging sources, whereby the minimum necessary array of subsets that is capable of identifying the defined maximum number of ranging sources as faulty is found, this approach adapting the necessary computations in the failure detection and exclusion technique to the assumptions made, and selecting the subsets not only with respect to their ability to check failure combinations but also by their WDOP values.

10. The method according to claim 1, further comprising minimizing the number of subsets to be evaluated by limiting the number of detectable faulty satellites.

11. A method of operating a satellite navigation receiver estimating its position, said method comprising:
  receiving a multiplicity of signals each transmitted by another satellite as a ranging source;
  using a failure detection technique being capable of detecting ranging source failures, and whose strength is in the suggestion of possibly failed ranging sources at very low biases, whereby the results with this technique serve as an input for additional algorithms counting the number of times for each ranging source being an outlier, every time a ranging source is determined not to be an outlier, the counter for that ranging source is increased, and as it is not guaranteed that every ranging source is included in exactly the same amount of subsets, the times the ranging source is part of the current subset are also counted, what is necessary, as a ranging source that is part of the position solution cannot be an outlier, the addition of the counters normalizing these different initial conditions, and
  determining the ranging source with the highest counter value as most likely to be faulty and to be investigated by a subsequently executed procedure.

12. The method according to claim 11, further comprising using only the minimum necessary number of ranging sources.

13. The method according to claim 11, further comprising verifying the subsets together with their consistent ranging sources by a simple RAIM algorithm, to check the integrity of this set, to avoid selecting a faulty subset of ranging sources.

14. The method according to claim 11, further comprising utilizing a preselection technique of subsets that evaluates the subsets with respect to their geometry.

15. The method according to claim 14, further comprising computing the condition of the geometry matrices and thus evaluating the orthogonality of the normal vectors in the four-dimensional vector space.

16. The method according to claim 15, further comprising using the Weighted Dilution of Precision (WDOP) as a rating for the subsets to incorporate the estimated variances of the pseudoranges of each ranging source that is part of the subset.

17. The method according to claim 15, further comprising combining with the preselection technique of determining the orthogonality only in a two-dimensional space by calculating the correlation of each possible pair of vectors from the receiver to the individual ranging sources, and by excluding all subsets with unacceptable pairings having a high correlation value by showing in about the same direction.

18. The method according to claim 14, further comprising determining the orthogonality only in a two-dimensional space by calculating the correlation of each possible pair of vectors from the receiver to the individual ranging sources, and by excluding all subsets with unacceptable pairings having a high correlation value by showing in about the same direction.

19. The method according to claim 11, further comprising applying a post selection technique to identify only a certain maximum number of faulty ranging sources, whereby the minimum necessary array of subsets that is capable of identifying the defined maximum number of ranging sources as faulty is found, this approach adapting the necessary computations in the failure detection and exclusion technique to the assumptions made, and selecting the subsets not only with respect to their ability to check failure combinations but also by their WDOP values.

20. The method according to claim 11, further comprising minimizing the number of subsets to be evaluated by limiting the number of detectable faulty satellites.

* * * * *